United States Patent [19]
Kobayashi et al.

[11] Patent Number: 5,638,485
[45] Date of Patent: Jun. 10, 1997

[54] VIDEO SIGNAL PROCESSING APPARATUS FOR PROCESSING VIDEO SIGNALS WITH DIFFERENT ASPECT RATIOS

[75] Inventors: Takashi Kobayashi, Mitaka; Hiroyuki Takimoto; Taizou Hori, both of Yokohama; Hiroyuki Fukuoka, Hiratsuka; Yoshihiro Nakatani, Yokohama; Jun Makino, Kunitachi; Shinichi Koyama, Tokyo, all of Japan

[73] Assignee: Canon Kabushiki Kaisha, Tokyo, Japan

[21] Appl. No.: 259,495

[22] Filed: Jun. 14, 1994

Related U.S. Application Data

[62] Division of Ser. No. 74,957, Jun. 10, 1993, Pat. No. 5,347,318.

[30] Foreign Application Priority Data

| Jun. 16, 1992 | [JP] | Japan | 4-156783 |
| Jun. 16, 1992 | [JP] | Japan | 4-156785 |
| Jun. 16, 1992 | [JP] | Japan | 4-156786 |
| Jun. 16, 1992 | [JP] | Japan | 4-156787 |

[51] Int. Cl.⁶ .................................................. H04N 5/782
[52] U.S. Cl. ........................... 386/123; 348/556; 348/558
[58] Field of Search .................................. 348/445, 555, 348/556, 558, 627, 397, 478, 564, 588, 604; 358/335; 386/37, 123; H04N 5/48, 5/781, 5/782

[56] References Cited

U.S. PATENT DOCUMENTS

| 4,394,690 | 7/1983 | Kobayashi | 358/180 |
| 4,786,986 | 11/1988 | Yamanashi et al. | 386/123 |
| 5,122,885 | 6/1992 | Yoshioka et al. | 358/310 |
| 5,245,482 | 9/1993 | Sagawa et al. | 360/38.1 |
| 5,257,141 | 10/1993 | Matsumi et al. | 386/37 |
| 5,307,171 | 4/1994 | Azuma et al. | 358/335 |
| 5,323,244 | 6/1994 | Yamaguchi et al. | 358/335 |
| 5,329,374 | 7/1994 | Ezaki | 358/310 |
| 5,339,165 | 8/1994 | Inoue et al. | 358/312 |
| 5,347,313 | 9/1994 | Choi | 348/445 |
| 5,347,318 | 9/1994 | Kobayashi et al. | 348/556 |
| 5,365,276 | 11/1994 | Imai et al. | 348/556 |
| 5,392,069 | 2/1995 | Koyama et al. | 348/239 |
| 5,416,598 | 5/1995 | Ezaki | 358/310 |
| 5,428,454 | 6/1995 | Kimura | 358/335 |
| 5,444,492 | 8/1995 | Kihara | 348/445 |
| 5,465,159 | 11/1995 | Ohashi | 386/123 |

*Primary Examiner*—Victor R. Kostak
*Attorney, Agent, or Firm*—Morgan & Finnegan, L.L.P.

[57] ABSTRACT

A video signal processing apparatus including an input unit for inputting a video signal, a detecting unit for detecting an aspect ratio of the video signal inputted to the input unit, a holding unit for holding aspect information representing the aspect ratio detected by the detecting unit, an abnormal state detecting unit for detecting an abnormal state of the video signal inputted to the input unit, and an output unit for selectively outputting aspect information outputted from the aspect ratio detecting unit and the aspect information held by the holding unit, in accordance with an output of the abnormal state detecting unit.

13 Claims, 11 Drawing Sheets

(SQUEEZE SIGNAL)

VIDEO SIGNAL PROCESSING APPARATUS FOR PROCESSING VIDEO SIGNALS WITH DIFFERENT ASPECT RATIOS

This is a divisional of application Ser. No. 08/074,957 filed Jun. 10, 1993, now U.S. Pat. No. 5,347,318.

BACKGROUND OF THE INVENTION

1. Field of the Invention

The present invention relates to a video signal processing apparatus, and more particularly to a video signal processing apparatus capable of processing video signals having different aspect ratios.

2. Related Background Art

The aspect ratio of a conventional television signal is 3:4, whereas a high definition television signal has an aspect ratio of 9:16.

A so-called wide monitor is available in the market which converts a Hi-Vision signal into an NTSC signal and displays it on a wide screen having the aspect ratio of 9:16 by using the NTSC method.

It is convenient to superpose a discrimination signal between the aspect ratios 3:4 and 9:16 on a video signal to allow a monitor to automatically judge the aspect ratio.

A method has already been proposed in which aspect ratio digital information (hereinafter called an aspect ID) is superposed on the twentieth and two hundreds and eighty third lines of the video signal during the vertical blanking period.

There are monitors requiring the aspect ID and monitors not requiring it.

An image processing apparatus for the aspect ratio 3:4, as well as an image processing apparatus for the aspect ratio 9:16 has already been developed. However, these image processing apparatus cannot process video signals having different aspect ratios.

A video signal processing apparatus capable of processing video signals having different aspect ratios has been long expected.

The following points should be taken into consideration when such a video signal processing is intended to be realized.

For example, as the application of selective synthesization of a plurality of video signals, there are known image switching, wipe, scroll, cross fade, picture-in-picture, and the like.

A conventional video signal processing apparatus performs selective synthesization of a plurality of input video signals, with no consideration of a difference between aspect ratios of the video signals.

In the case of a VTR as the video signal processing apparatus, a synchronization signal which is to be essentially superposed on a reproduced video signal may sometimes be lost or may become unstable during a specific reproduction process (such as high speed search reproduction, slow reproduction, and still image reproduction). In such a case false horizontal or vertical synchronization signal has been generated conventionally. Also in a conventional VTR, cutting pulses are not provided within vertical synchronization pulses.

If there is no cutting pulse on the vertical synchronization pulse, it is not possible to correctly count the twentieth and two hundreds and eighty third lines during the vertical blanking period, and therefore to detect the aspect ID. Or a multiplied character signal recorded after and before the aspect ID is erroneously detected.

In such a case, the wide monitor receives a video signal with the aspect ratio 9:16 as a video signal with the aspect ratio 3:4 and displays it with the aspect ratio 3:4.

SUMMARY OF THE INVENTION

It is an object of the present invention to solve the above problems associated with the conventional techniques and provide a video signal processing apparatus capable of processing video signals having different aspect ratios.

According to a preferred embodiment, the video signal processing apparatus includes input means for inputting a video signal, detecting means for detecting the aspect ratio of a video signal supplied from the input means, holding means for holding aspect information of the aspect ratio detected by the detecting means, abnormal state detecting means for detecting an abnormal state of a video signal supplied from the input means, and output means for selectively outputting either aspect information outputted from the detecting means or the aspect information held by the holding means, in accordance with an output of the abnormal state detecting means.

Other objects and advantages of the invention will become apparent from the following detailed description taken in conjunction with the appended claims.

DETAILED DESCRIPTION OF THE PREFERRED EMBODIMENTS

Prior to describing a video signal processing system of the embodiments according to the present invention, the following assumption applied to the embodiments will be explained.

In the embodiments, a high definition video signal (Hi-Vision signal) is not converted into an ordinary definition video signal (current television signal), but current television signals (e.g., NTSC signals) are used.

Namely, in the following description, a video signal having an aspect ratio 9:16 is a video signal (hereinafter called a squeeze signal) for an image compressed (reduced) in the horizontal direction to change the aspect ratio 9:16 to 3:4.

Figure 1:
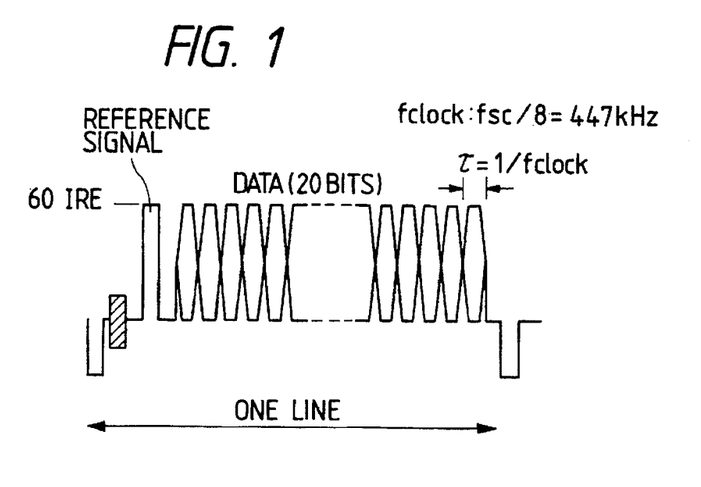
FIG. 1 shows the waveform of an aspect ID.
Figure 2:
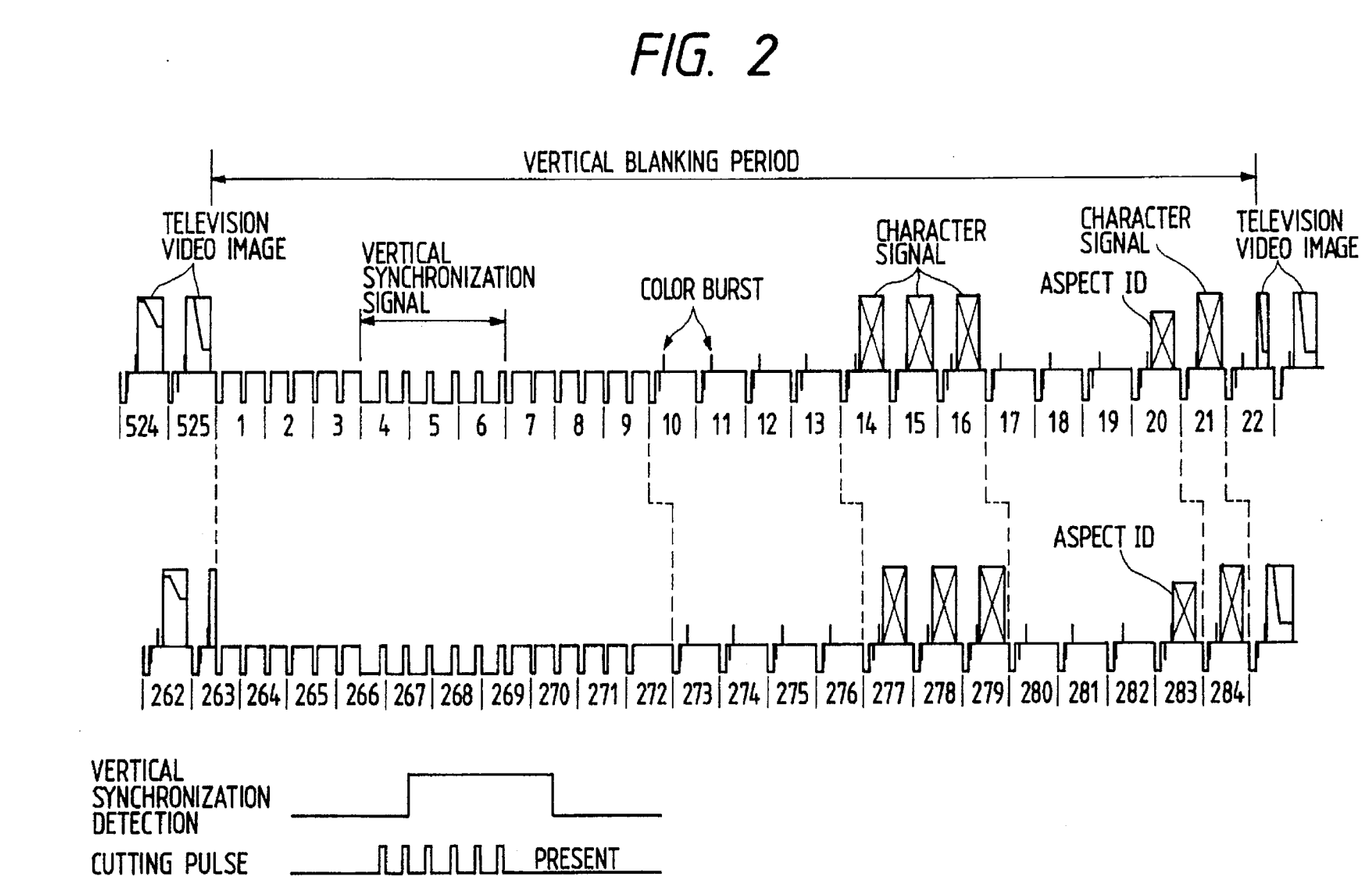
FIG. 2 illustrates aspect IDs superposed during the vertical blanking period.

As a method of discriminating between the squeeze signal and a normal aspect ratio 3:4 video signal, aspect digital information (hereinafter called an aspect ID) is superposed on the twentieth and two hundreds and eighty third lines of a video signal, for example, NTSC video signal, during the vertical blanking period. FIG. 1 shows the waveform of an aspect ID. FIG. 2 illustrates aspect IDs superposed during the vertical blanking period.

The aspect ID is detected to judge whether the video signal is a squeeze signal or an ordinary video signal.

With the above assumption, the video signal processing system according to the embodiments of the present invention will be described.

Figure 3:
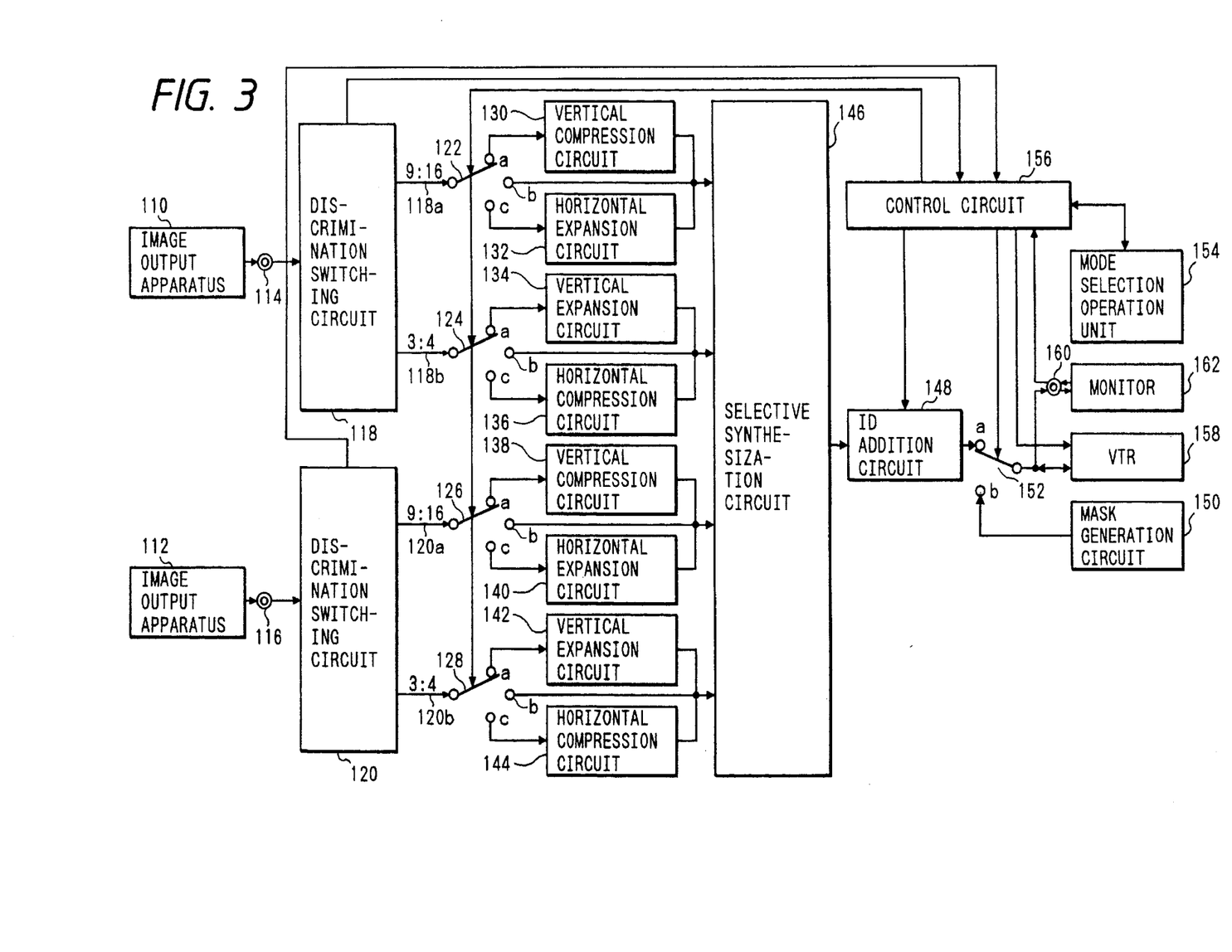
FIG. 3 is a block diagram showing the structure of a video signal processing system according to an embodiment of the present invention.

FIG. 3 is a block diagram showing the structure of a video signal processing system according to an embodiment of the present invention.

In FIG. 3, reference numerals 110 and 112 represent image output apparatuses, such as a television broadcasting output apparatus (ground station, satellite station), a video camera, and a reproduction apparatus for a video tape or optical disk, for outputting a video signal (squeeze signal) with the aspect ratio 9:16 or a video signal with the aspect ratio 3:4.

Reference numerals 114 and 116 represent input terminals to which video signals are applied, and reference numerals 118 and 120 represent discrimination switching circuits for detecting the aspect ratios of video signals inputted from the input terminals 114 and 116 and selectively outputting them in accordance with the detection results.

Reference numerals 122, 124, 126, and 128 represent switches, reference numerals 130 and 138 represent vertical compression circuits, reference numerals 132 and 140 represent horizontal expansion circuits, reference numerals 134 and 142 represent vertical expansion circuits, and reference numerals 136 and 144 represent horizontal compression circuits.

Reference numeral 146 represents a selective synthesization circuit for selectively synthesizing two inputted video signals.

Reference numeral 148 represents an ID addition circuit for adding an aspect ID to the squeeze signal outputted from the selective synthesization circuit 146. Reference numeral 150 represents a mask generation circuit for generating a mask signal. Reference numeral 152 represents a switch for selecting either an output of the ID addition circuit 148 or an output of the mask generation circuit. Reference numeral 154 represents a mode selection operation unit for selecting an image synthesization mode. Reference numeral 156 represents a controller for controlling the operations of the switches 122, 124, 126, 128, and 152, and ID addition circuit, in accordance with the detection results of the discrimination switching circuits 118 and 120 and an output of the mode selection operation unit 154.

The control circuit 156 causes the mode selection operation unit 154 to display selectable modes in accordance with the detection results of the discrimination switching circuits 118 and 120, and allows an operator to select a mode while referring to the displayed selectable modes.

Reference numeral 158 represents a VTR which can record and reproduce a video signal from the switch 152, and reference numeral 160 represents an external output terminal.

Reference numeral 162 represents a monitor connected to an output terminal 160. A discrimination signal for discriminating between the aspect ratios 9:16 and 3:4 of the monitor 162 is supplied from the monitor 162 to the control circuit 156 via the output terminal 160.

A video signal recorded by VTR 158 can be reproduced upon actuation of a reproduction switch of the mode selection operation unit 154. The reproduced video signal is inputted to the monitor 162 via the output terminal 160 and displayed on the screen.

Figure 4:
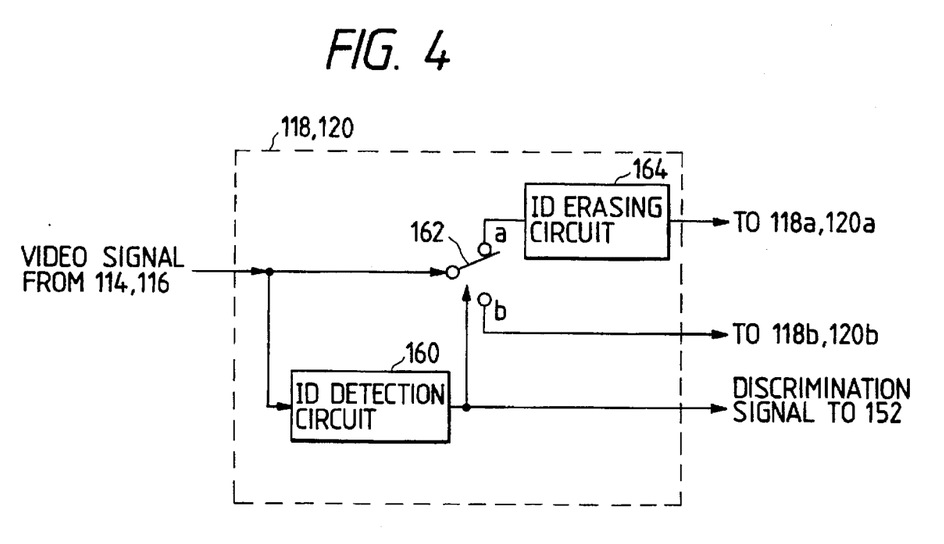
FIG. 4 is a block diagram showing the internal circuit structure of the discrimination switching circuits 118 and 120 shown in FIG. 3.

An example of the internal structure of the discrimination switching circuits 118 and 120 is shown in FIG. 4.

In FIG. 4, reference numeral 160 represents an ID detection circuit for discriminating whether the signals applied to the input terminals 114 and 116 are the squeeze signal or the ordinary video signal with the aspect ratio 3:4.

Reference numeral 162 is a switch whose connection is selected in accordance with the detection result of the ID detection circuit 160.

Reference numeral 164 represents an ID erasing circuit for erasing the aspect ID superposed on the video signal during the vertical blanking period.

The operation of the discrimination circuits 118 and 120 constructed as above will be described.

The video signals applied to the input terminals 114 and 116 are inputted to the ID detector circuit 160 to detect the aspect ID. The detection result of the ID detection circuit is supplied to the switch 162 and to a control circuit 152 to be described later.

If the detection result of the ID detection circuit 160 indicates that the input signal is the squeeze signal, the switch 162 is connected to a contact a, so that the superposed aspect ID is erased by the ID erasing circuit 164 and the signal is outputted to signal lines 118a and 120a.

If the detection result of the ID detection circuit 160 indicates that the input signal is the ordinary video signal with the aspect ratio 3:4, the switch 162 is connected to a contact b so that the signal is outputted to signal lines 118b and 120b.

Next, the operation of the vertical compression circuits 130 and 138 will be described.

The vertical compression circuits 130 and 138 compress (reduce) the squeeze signal (image portion) by ¾ in the vertical direction. The compressed signal is outputted with the upper and lower empty portions being masked.

Figure 5:
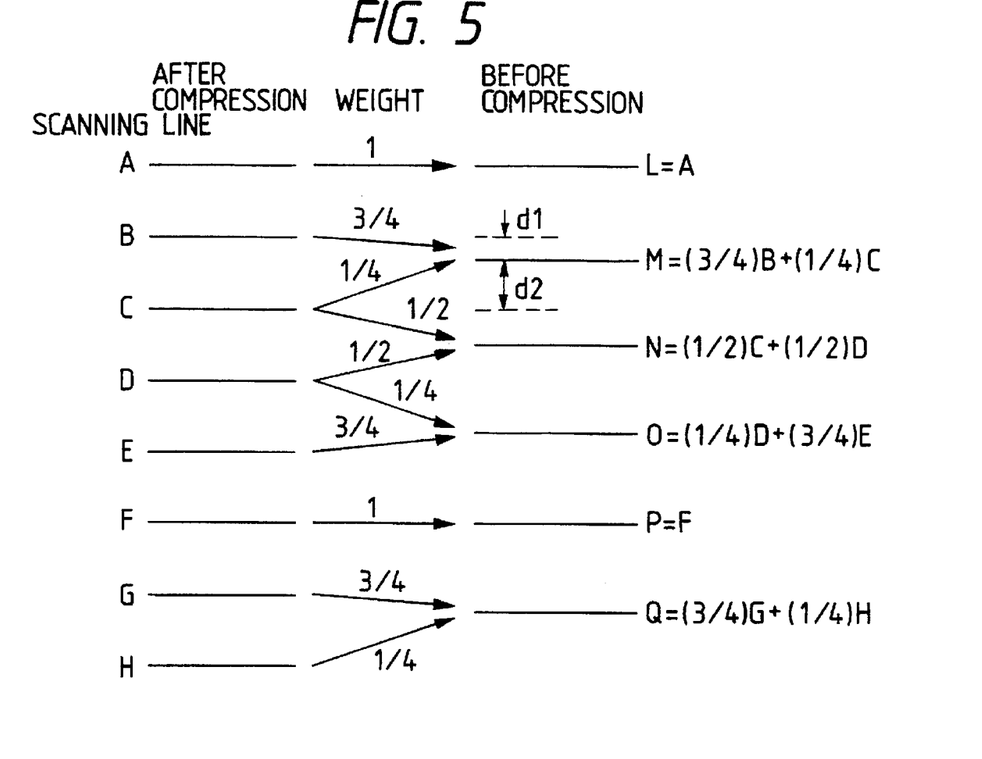
FIG. 5 is a diagram explaining the principle of vertical compression through digital processing.

Referring to FIG. 5, the principle of the vertical compression by the vertical compression circuits 130 and 138 will be described more in detail.

Since the squeeze signal is compressed by ¾ in the vertical direction, eight horizontal scan lines are reduced to six horizontal scan lines.

Specifically, as shown in FIG. 5, the horizontal scan lines L to Q after the compression are calculated from the horizontal scan lines A to H before the compression by using the weights corresponding to the distances between the horizontal scan lines A to H before the compression and the horizontal scan lines L to Q after the compression.

For example, since the horizontal scan line L is the same as the horizontal scan line A,

L=A

The horizontal scan line M is located at a distance d1 from the horizontal scan line B before the compression, and at a distance d2 from the horizontal scan line C before the compression. Therefore, d1:d2=1:3 for the ¾ compression. Using the weights ¾ and ¼ for the horizontal scan lines B and C, the horizontal scan line M is represented by:

M=(¾) B+(¼) C

Since the horizontal scan line N is located at an equidistance from the horizontal scan lines C and D,

N=(½) C+(½) D

Similarly, the calculated horizontal scan lines O to Q are compressed by ¾ in the vertical direction.

Next, the operation of the horizontal expansion circuits will be described.

The central portion of the squeeze signal during each horizontal video image period with the ⅛ right and left portions being removed, is expanded to one horizontal video image period. Namely, the central portion of the video image is expanded by 4/3 in the horizontal direction. As a result, a video image with the aspect ratio 9:16 is converted into a video image with the aspect ratio 3:4 removing the right and left portions. Such horizontal expansion can be easily realized by digital processing (such as adjustment of sampling frequency and period, memory processing, weighted addition of adjacent pixel values).

Next, the operation of the vertical expansion circuits 134 and 142 will be described.

The central area of the video image with the aspect ratio 3:4 is expanded (enlarged) to one vertical period with the ⅛ upper and lower portions being removed.

Specifically, this expansion is opposite to the vertical compression described with FIG. 5. The horizontal scan line A is formed from the horizontal scan line L, and the horizontal scan line B is formed from weighted horizontal scan lines L and M.

A video image outputted from the vertical expansion circuits 134 and 142 is a video image (squeeze signal) with the aspect ratio 9:16 removing the upper and lower portions of the video image with the aspect ratio 3:4.

Next, the operation of the horizontal compression circuits 136 and 144 will be described.

The video image with the aspect ratio 3:4 is compressed (reduced) in the horizontal direction to make the video image match the monitor screen with the aspect ratio 9:16 in the vertical direction.

A video image outputted from the horizontal compression circuits 136 and 144 is a video image (squeeze signal) with the aspect ratio 9:16 obtained by compressing the video image with the aspect ratio 3:4 in the horizontal direction.

Figure 6:
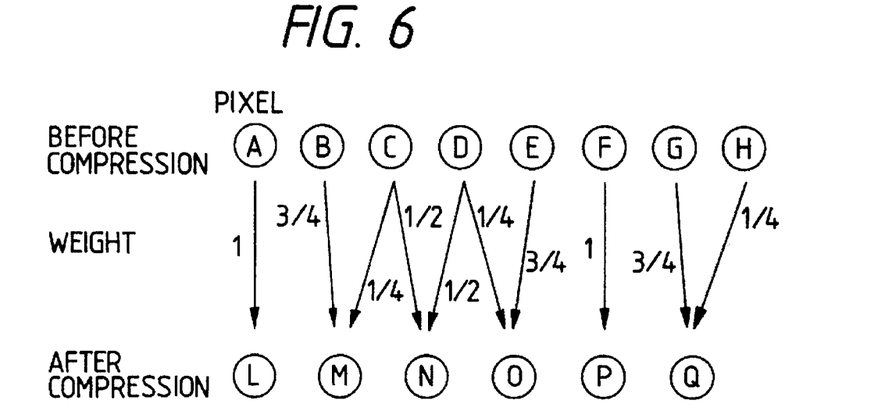
FIG. 6 is a diagram explaining the principle of horizontal compression through digital processing.

Referring to FIG. 6, the principle of horizontal compression by the horizontal compression circuits 136 and 144 will be described more in detail.

Although analog processing is possible, digital processing which is considered to be the future main trend will be described.

Since the video image picked up from the central portion of one horizontal video image period is compressed by ¾, eight pixels are reduced to six pixels on a horizontal scan line. Each pixel value can be calculated by using known interpolation calculation.

Representing the pixels before the compression by A to H and those after the compression by M to Q, the pixel A is used directly as the pixel L, and the pixel M is calculated from the pixels B and C weighted by the corresponding distances to the pixel M. Namely,

M=( ¾) B+(¼) C

Although this is conducted for the horizontal scan line, this processing is similar to the processing for the vertical compression explained with FIG. 5. The pixels N to Q are obtained in the same manner.

The operation of the image synthesization of the system constructed as above will be described.

In the following, a video signal (squeeze signal) with the aspect ratio 9:16 and an ordinary video signal with the aspect ratio 3:4 are assumed to be inputted.

Namely, a squeeze signal outputted from the image output apparatus 110 is applied to the input terminal, and an ordinary video signal outputted from the image output apparatus 112 is applied to the input terminal 116.

Figure 7A:
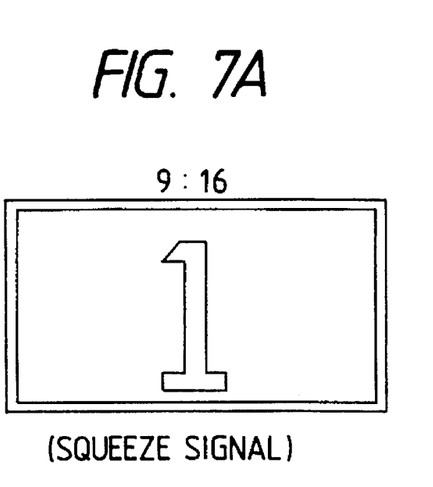
FIGS. 7A and 7B show examples of images outputted from the image output apparatuses 110 and 112.
Figure 7B:
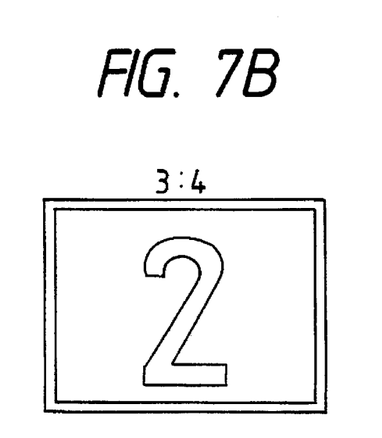

Examples of video images outputted from the image output apparatus 110 and 112 are shown in FIGS. 7A and 7B.

FIG. 7A shows an image outputted from the image output apparatus 110, and FIG. 7B shows an image outputted from the image output apparatus 112.

Figure 8:
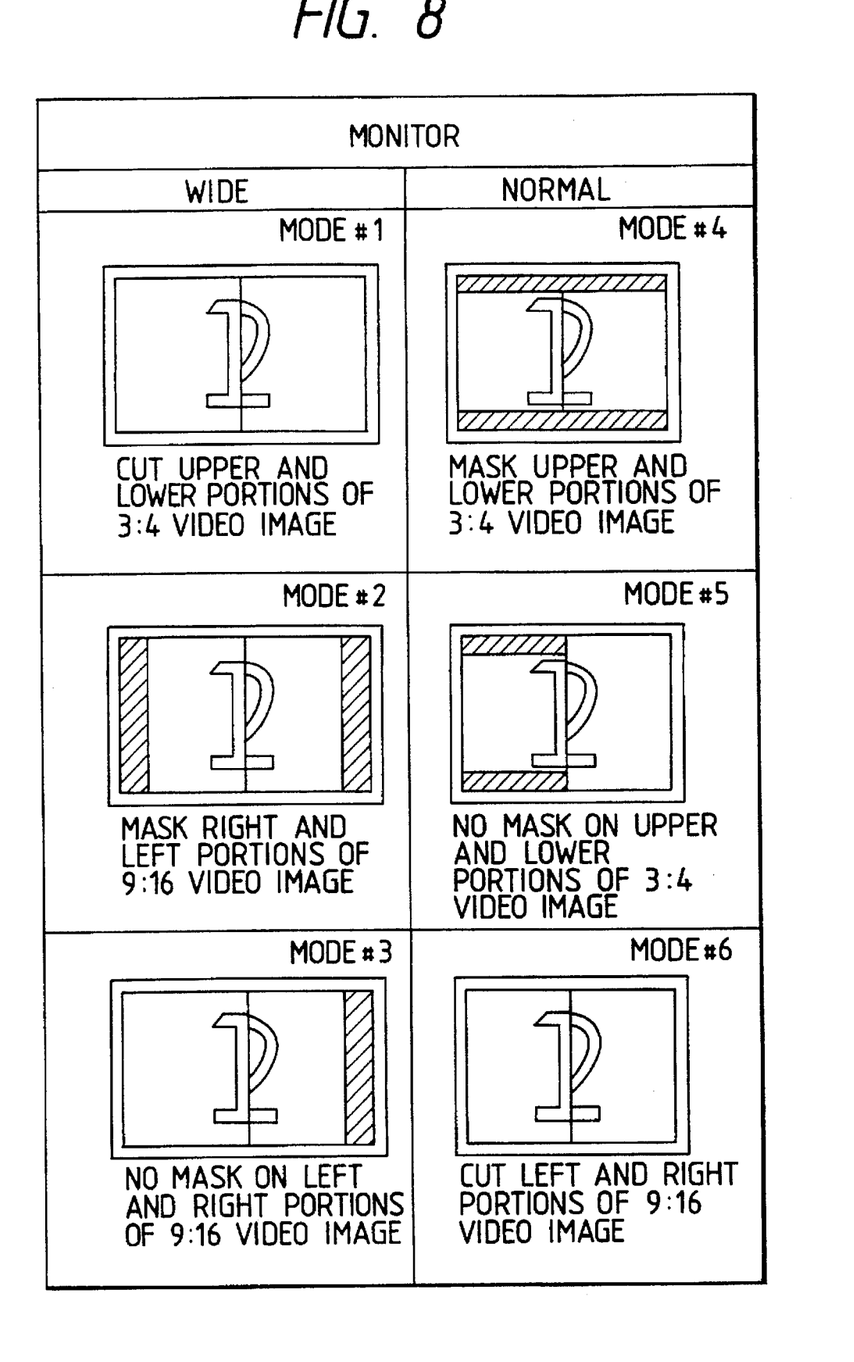
FIG. 8 is a diagram explaining synthesizing modes for video images with the aspect ratios 3:4 and 9:16.

Eight modes such as shown in FIG. 8 can be selected from the mode selection operation unit 154.

In this embodiment, the modes #1 to #3 can be selected when a monitor with the aspect ratio 9:16 is connected, and the modes #4 to #6 can be selected when a monitor with the aspect ratio 3:4 is connected.

The images shown in FIG. 8 are synthesized images on the monitor while executing the wipe process at each mode.

The operation to be executed when the mode #1 is selected will be described.

In the mode #1, a video image with the aspect ratio 3:4 applied to the input terminal 116 is converted to a video image with the aspect ratio 9:16 by removing the upper and lower portions.

Specifically, in the mode #1, the control circuit 156 connects the switch 122 to the contact b and the switch 128 to the contact a to synthesize the images. The synthesized video signal is added with the aspect ID by the ID addition circuit 148. A video signal outputted from the ID addition circuit 148 is passed from the switch 152, VTR 153, output terminal 160 to the monitor 162. The switch 152 is always connected to the contact a by the control circuit 156.

The operation to be executed when the mode #2 is selected will be described.

In the mode #2, a video image with the aspect ratio 9:16 is converted into a video image with the aspect ratio 3:4 by masking the right and left portions, and after the selective synthesization, a video image with the aspect ratio 9:16 is outputted.

Specifically, in the mode #2, the control circuit 156 connects the switch 122 to the contact b and the switch 128 to the contact c to synthesize the images. The synthesized video signal is added with the aspect ID by the ID addition circuit 148. A video signal outputted from the ID addition circuit 148 is passed from the switch 152, VTR 153, output terminal 160 to the monitor 162.

The switch 152 is connected to the contact a in the ordinary period, and connected to the contact b during the mask period.

The control circuit 156 connects the switch 152 to the contact b during the ⅛ start and end periods of the horizontal period, and connects it to the contact a during the remaining period. In this manner, an image with its ⅛ right and left portions being masked is displayed on the monitor screen with the aspect ratio 9:16.

The operation to be executed when the mode #3 is selected will be described.

The mode #3 is the same as the mode #2 excepting that a video image with the aspect ratio 9:16 is not masked.

Specifically, in the mode #3, the control circuit 156 connects the switch 152 always to the contact a. As a result, the video image supplied via the input terminal 114 is not masked even during the wipe process.

The operation to be executed when the mode #4 is selected will be described.

In the mode #4, a video image with the aspect ratio 3:4 is masked at its upper and lower portions to process it as if it is a video image with the aspect ratio 9:16.

Specifically, in the mode #4, the control circuit 156 connects the switch 122 to the contact a and the switch 128 to the contact b. The synthesized video signal is not processed by the ID addition circuit 148, and is passed from the switch 152, VTR 153, output terminal 160 to the monitor 162.

In the mode #4, of the video images outputted from the selective synthesization circuit 146, the video image supplied via the input terminal 114 is masked at its ⅛ upper and lower portions, whereas the video image supplied via the input terminal 116 is not masked. In order to mask the video image supplied via the input terminal 116 at its ⅛ upper and lower portions like the video image via the input terminal 114, the control circuit 156 connects the switch 152 to the contact b during the ⅛ start and end periods of the vertical period, and connects it to the contact a during the remaining period. In this manner, the upper and lower portions of the video image can be observed naturally during the synthesization.

The operation to be executed when the mode #5 is selected will be described.

In the mode #5, a video image supplied via the input terminal 116 is not masked at its upper and lower portions.

Specifically, in the mode #5, the switches 122 and 128 take the same contact conditions as the mode #4, and the switch 152 is always connected to the contact a.

In the mode #6, a video image with the aspect ratio 9:16 supplied via the input terminal 114 is converted into a video image with the aspect ratio 3:4 removing its right and left portions. The converted video image and a video image with the aspect ratio 3:4 supplied via the input terminal 116 are synthesized. Specifically, in the mode #6, the control circuit 156 connects the switch 122 to the contact c and the switch 128 to the contact b. The synthesized video signal is not processed by the ID addition circuit 148, and is passed via the switch 152, VTR 153, output terminal 160 to the monitor 162.

The switch 152 is always connected to the contact a by the control circuit 156.

It is obvious that the above-described operation to be executed when each mode is selected, is applicable to the case wherein a video image with the aspect ratio 3:4 is supplied via the input terminal 114 and a video image with the aspect ratio 9:16 is supplied via the input terminal 116.

If video images with the aspect ratio 3:4 are supplied via both the input terminals 114 and 116, the images with the aspect ratio 3:4 as well as the images with the converted aspect ratio 9:16, can be synthesized.

Conversely, if video images with the aspect ratio 9:16 are supplied via both the input terminals 114 and 116, video images with the aspect ratio 9:16 as well as the images with the aspect ratio 3:4 converted through vertical compression or horizontal expansion, can be synthesized.

If a signal outputted from the selective synthesization circuit 146 is a squeeze signal, the ID addition circuit 148 superposes the aspect ID on the video signal outputted from selective synthesization circuit 146.

In the above embodiment, two video signals are inputted. Obviously, the present invention is not limited only to two inputs, but is applicable to three or more inputs.

As readily appreciated from the forgoing description, this embodiment allows selective synthesization even if a plurality of video signals having a different aspect ratio are inputted.

As discussed with this embodiment, if a synthesized video signal is a squeeze signal, the aspect ID is superposed on the video signal.

The aspect ID is important information when an image is displayed.

Therefore, for the video signal processing apparatus for processing video images having a plurality of aspect ratios, it is important to provide a countermeasure for a lost aspect ID.

Another embodiment will be described wherein a countermeasure for a lost aspect ID is presented.

This embodiment is applied to VTR 158 of the video signal processing system shown in FIG. 3.

In some cases, an aspect ID cannot be detected while performing a specific reproduction operation at VTR 158.

In the following, an embodiment of a countermeasure for a lost aspect ID during a specific reproduction operation will be described.

A reproduction system of VTR 158 according to the embodiment will be described with reference to FIGS. 9 to 14.

Figure 9:
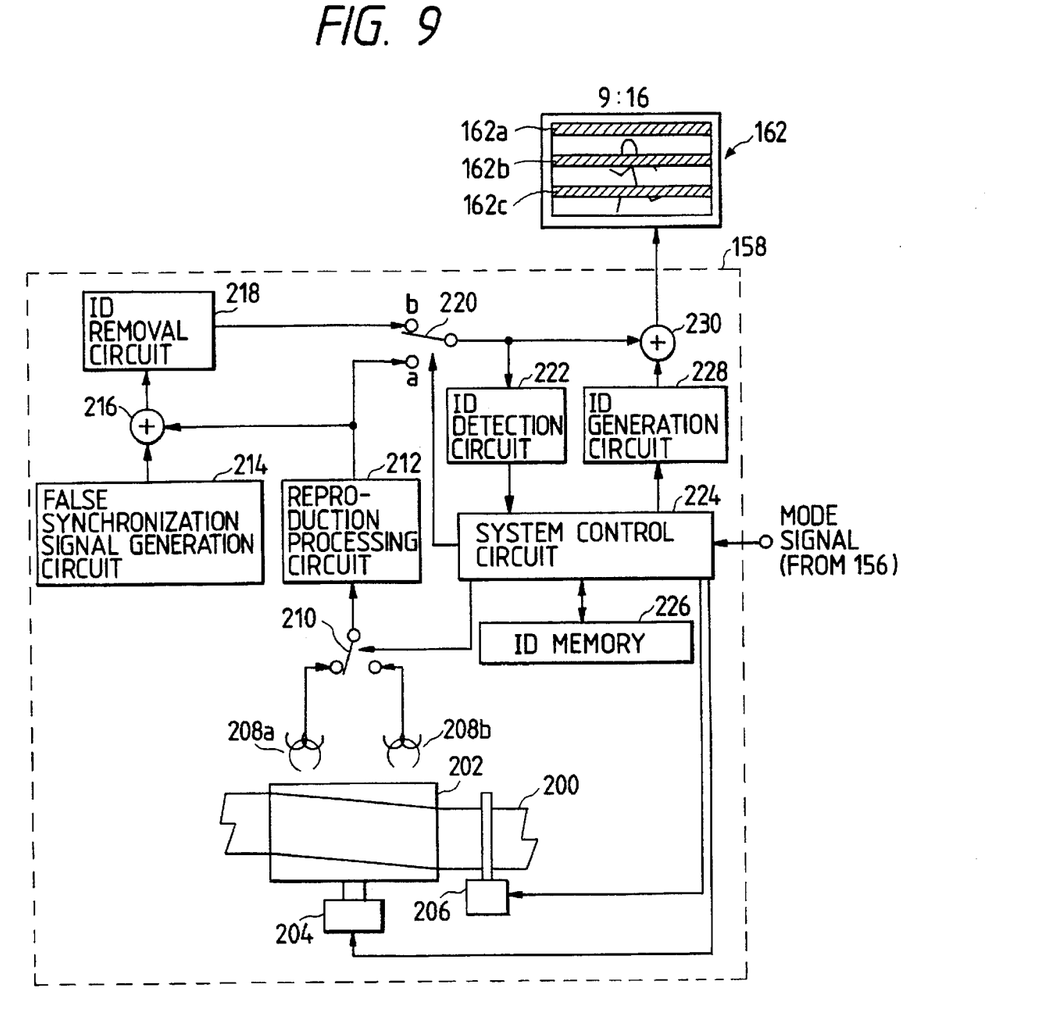
FIG. 9 is a block diagram showing the reproduction system of VTR 158 shown in FIG. 3.

FIG. 9 is a block diagram showing the structure of a VTR reproduction system of the embodiment. In FIG. 9, reference numeral 200 represents a magnetic tape with a video signal recorded in a helical scan method. If the video signal is not for the aspect ratio 3:4, the aspect ID is superposed on the video signal at a proper timing and recorded in the magnetic tape 200.

Reference numeral 202 represents a rotary drum, reference numeral 204 represents a drum motor for rotating the rotary drum 202, and reference numeral 206 represents a capstan motor for feeding the magnetic tape 200. Two reproduction heads 208a and 208b having a different azimuth are mounted on the rotary drum 202. The reproduction head 208a has a plus azimuth, and the reproduction head 208b has a minus azimuth. Reference numeral 210 represents a switch for selecting an output of the reproduction head 208a or 208b synchronously with the rotation of the rotary drum 202.

Reference numeral 212 represents a reproduction processing circuit for processing the output of the reproduction head 208a or 208b selected by the switch and outputs a reproduced video signal. Reference numeral 214 represents a false synchronization signal generation circuit for generating false horizontal and vertical synchronization signals. Reference numeral 216 represents an adder for adding an output (false synchronization signal) of the false synchronization signal generation circuit 214 to an output (reproduced video signal) of the reproduction processing circuit 212. Reference numeral 218 represents an ID removal circuit for removing the recorded aspect ID. Reference numeral 220 represents a switch for selecting either an output (at contact a) of the reproduction processing circuit 212 or an output (at contact b) of the ID removal circuit 218.

Reference numeral 222 represents an ID detection circuit for detecting the aspect ID from an output video signal, reference numeral 224 represents a system control circuit for controlling the entire system, and reference numeral 226 represents an ID memory for temporarily storing the aspect ID detected from a reproduced video signal. Reference numeral 228 represents an ID generation circuit for generating an aspect ID at a predetermined timing in response to an instruction from the system control circuit 224. Reference numeral 230 represents an adder for adding an output (aspect ID) of the ID generation circuit 224 to an output video signal. An output of the adder 230 is an output of VTR 158. The control circuit 156 supplies a mode signal for designating an operation mode to the system control circuit 224.

In this embodiment, the monitor 162 has a screen with the aspect ratio 9:16.

In this embodiment, it is assumed that a video signal with the aspect ratio 9:16 is recorded on the magnetic tape 200. A video image with the aspect ratio 9:16 is compressed by ¾ in the horizontal direction optically or electronically to obtain a video signal or a so-called squeeze signal.

Figure 10:
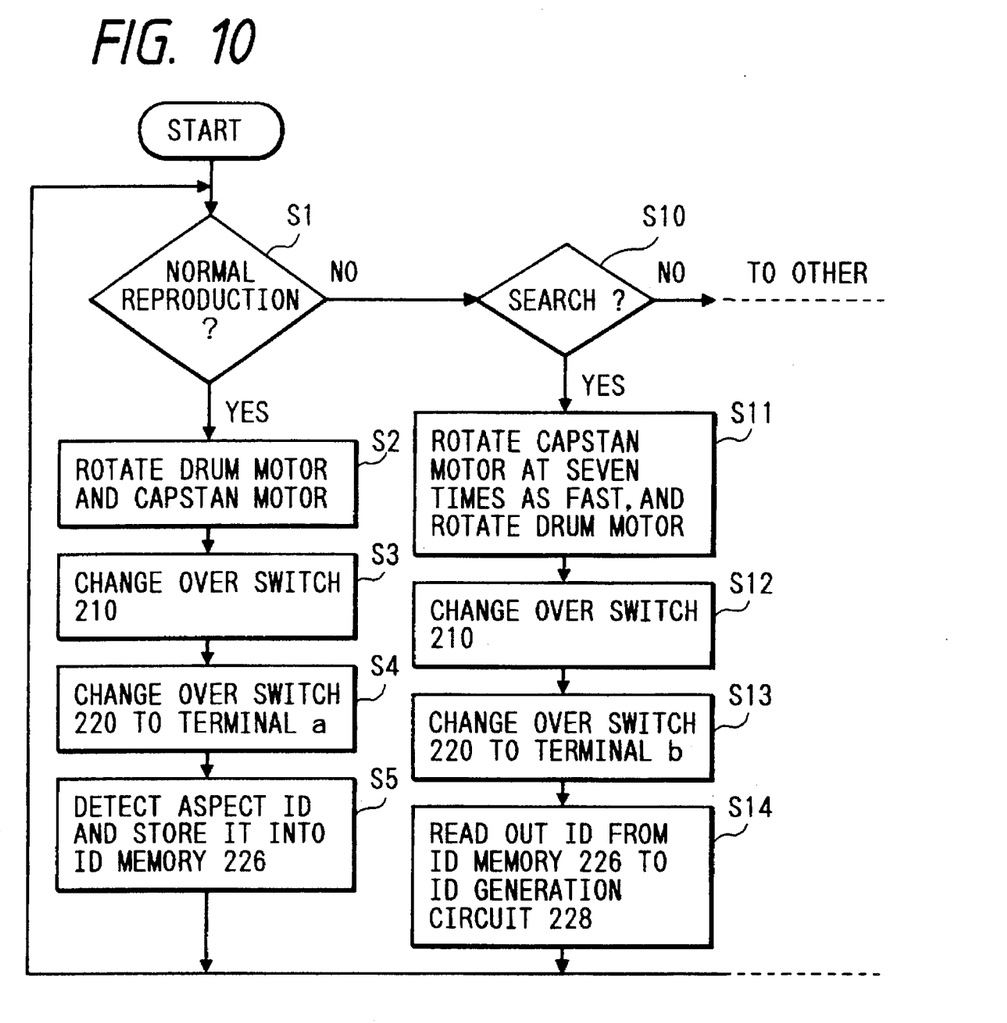
FIG. 10 is a flow chart explaining the reproduction operation of VTR system shown in FIG. 9.

FIG. 10 is a flow chart explaining the outline of the ordinary reproduction and search reproduction operations according to the embodiment.

When a mode signal indicating an ordinary reproduction mode is inputted from the control circuit 156 to the system control circuit 224, the system control circuit 224 enters the ordinary reproduction mode (Step S1), causes the drum motor 204 and capstan motor 206 to rotate at a predetermined speed (Step S2), and causes the switch 210 to alternately select the outputs of the reproduction heads 208a and 208b synchronously with the rotation phase of the rotary drum 202 (Step S3). In this case, the switch 210 is controlled to select the reproduction head 208a or 208b matching the azimuth of the reproduction track of the magnetic tape 200.

An output via the switch 210 is inputted to the reproduction processing circuit 212 which performs a known reproduction process such as demodulation to output a reproduced video signal. In the ordinary reproduction mode, the system control circuit 224 connects the switch to the contact a so that an output of the reproduction circuit 212 is applied via the switch 220 to the ID detection circuit 222 and adder 230. The ID detection circuit detects the aspect ID superposed on the reproduced video signal.

In the ordinary reproduction mode, the aspect ID on the recorded video signal is reliably reproduced by the magnetic heads 208a and 208b, and the ID detection circuit 222 can detect it. The ID detection circuit 222 outputs the detected aspect ID to the system control circuit 224. The aspect ID is not superposed on a video signal of an image with the aspect ratio 3:4. In this case, the ID detection circuit 222 cannot detect the aspect ID, and so an aspect ID indicating the aspect ratio 3:4 is outputted to the system control circuit 224. The system control circuit 224 stores the aspect ID detected by the ID detection circuit in the ID memory 226. The ID memory 226 stores only the latest ID supplied from the system control circuit 224.

In the ordinary reproduction mode, the vertical and horizontal synchronization signals of the reproduced video signal have the proper format and the aspect ID is being superposed at the proper timing. Accordingly, it is not necessary for the ID generation circuit 228 to generate the aspect ID. Namely, the reproduced video signal supplied via the switch 220 passes through the adder 230 and is applied to the monitor 162.

The monitor 162 checks the aspect ID of the reproduced video signal. If the aspect ID is not present, an image with the aspect ratio 3:4 is displayed, whereas if present, an image with the aspect ratio 9:16 is displayed.

Next, the operation to be executed when a forward 7-fold speed search mode is selected will be described. When a forward 7-fold speed search mode signal is supplied from the control circuit 156 to the system control circuit 224, the system control circuit 224 controls the entire system in the forward 7-fold speed search mode (Step S10). Specifically, in the forward 7-fold speed search mode, the system control circuit 224 causes the capstan motor 206 to rotate at the speed seven times as fast as the ordinary speed, and causes the drum motor 206 to rotate at a predetermined relative speed.

Figure 11:
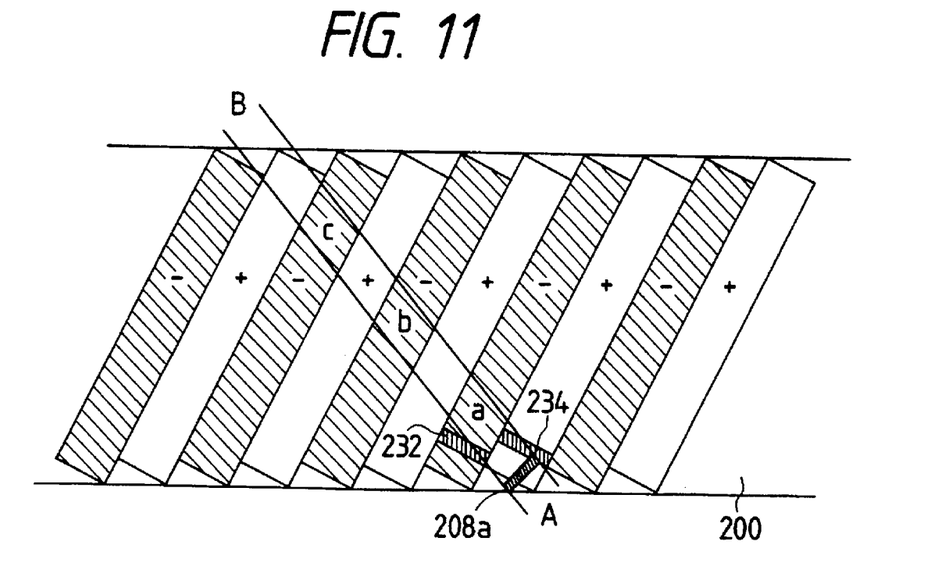
FIG. 11 is a diagram showing the head locus during the forward 7-fold speed reproduction according to the embodiment.

FIG. 11 shows the locus of the reproduction head running at the forward 7-fold speed. A + sign represents a plus azimuth track, and a − sign represents a minus azimuth track. For example, the head 208a moves from A to B. Since the head 208a is a plus azimuth head, it cannot reproduce minus azimuth tracks so that a reproduced signal cannot be obtained from the areas a, b, and c shown in FIG. 11. As a result, noise bars 162a, 162b, and 162c shown in FIG. 9 appear on the monitor screen. These noise bars 162a, 162b, and 162c result from a disability of reproduction at the areas a, b, and c.

In FIG. 11, reference numerals 232 and 234 represent the positions of the aspect IDs recorded on the minus and plus azimuth tracks. The reproduction head 208a can reproduce the aspect ID 232, but it cannot reproduce the aspect ID 234 because of the different azimuth. Taking tracking displacement into consideration, the reproduced aspect ID will probably be unstable.

In view of the above, in this embodiment, the switch 220 is connected to the contact b (Step S13), the aspect ID is generated by the ID generation circuit 228, the generated aspect ID corresponding to the aspect ID stored in the ID memory during the ordinary reproduction mode. The generated aspect ID is added to the reproduced video signal at the adder 230 (Step S14). This operation will be described more in detail hereinunder.

The reproduction processing circuit 212 processes an output of the reproduction head 208a or 208b and outputs a reproduced video signal. As described earlier, the aspect ID which is to be essentially superposed on the reproduced video signal may sometimes be lost or may become unstable. The false synchronization signal generation circuit 214 generates false horizontal and vertical synchronization signals which are then added to an output (reproduced video signal) of the reproduction processing circuit 212 at the adder 216. The ID removal circuit 218 clamps the twentieth and two hundreds and eighty third lines of the video signal outputted from the adder 216 to the pedestal level to remove unstable aspect IDs.

The video signal whose aspect IDs have been removed by the ID removal circuit 218 is applied via the switch 220 to the adder 230. The system control circuit 224 reads the aspect ID stored during the ordinary reproduction mode in the ID memory 226, and transfers it to the ID generation circuit 228. The ID generation circuit 228 generates the aspect ID signals at the proper timings. The adder 230 adds the aspect ID signals generated by the ID generation circuit 228 to the video signal supplied via the switch 220.

In this manner, VTR 158 outputs a video signal with stable aspect IDs being superposed. The monitor 162 can therefore detect the aspect ID superposed on the video signal, and displays an image reproduced in a specific reproduction mode on its wide screen.

Figure 12:
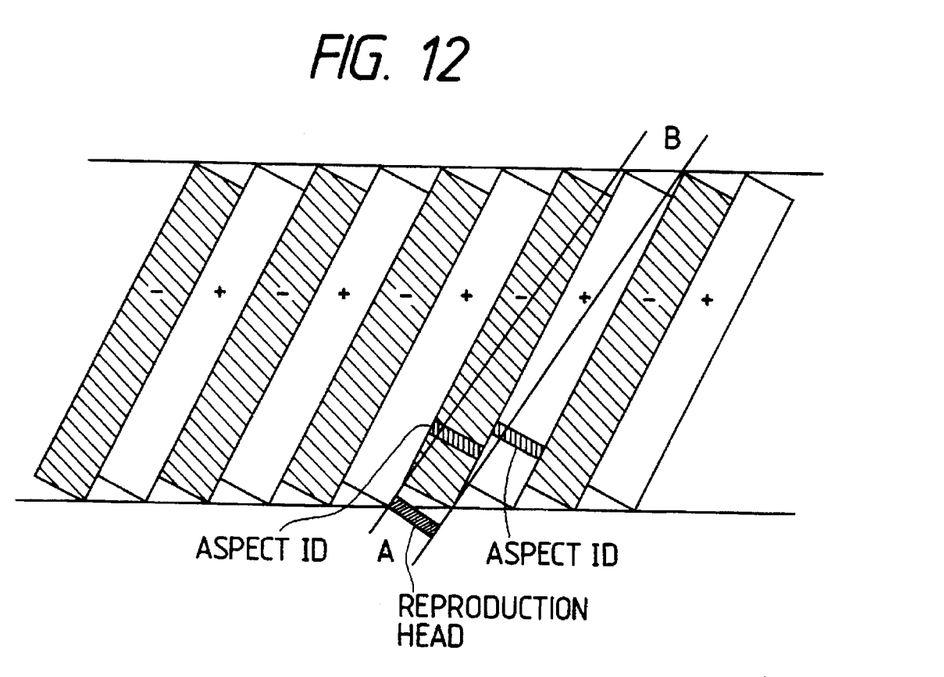
FIG. 12 is a diagram showing the head locus during the still image reproduction.

Although the forward 7-fold speed reproduction has been described by way of example, other specific reproduction operations in which the reproduction heads traverse the recording tracks may also be used. Such specific reproduction includes reverse rotation reproduction, reverse rotation search, frame feeding reproduction, still image reproduction, and slow reproduction. FIG. 12 shows the locus of the head during the still image reproduction.

Although VTR has been described in this embodiment, the embodiment is applicable to other general reproducing apparatuses for reproducing a video signal recorded on a recording medium difficult to be accessed access randomly, such as optical disks, magnetic disks, photomagnetic disks, and some type of solid memories.

As easily understood from the foregoing description, according to this embodiment, a video signal having an original aspect ratio can be reproduced even in a specific reproduction mode, and an image with the correct aspect ratio can be displayed.

An embodiment of the monitor 162 with the aspect ratio 9:16 shown in FIG. 9 and used for the countermeasure for a lost aspect ID, will be described with reference to FIG. 13.

Figure 13:
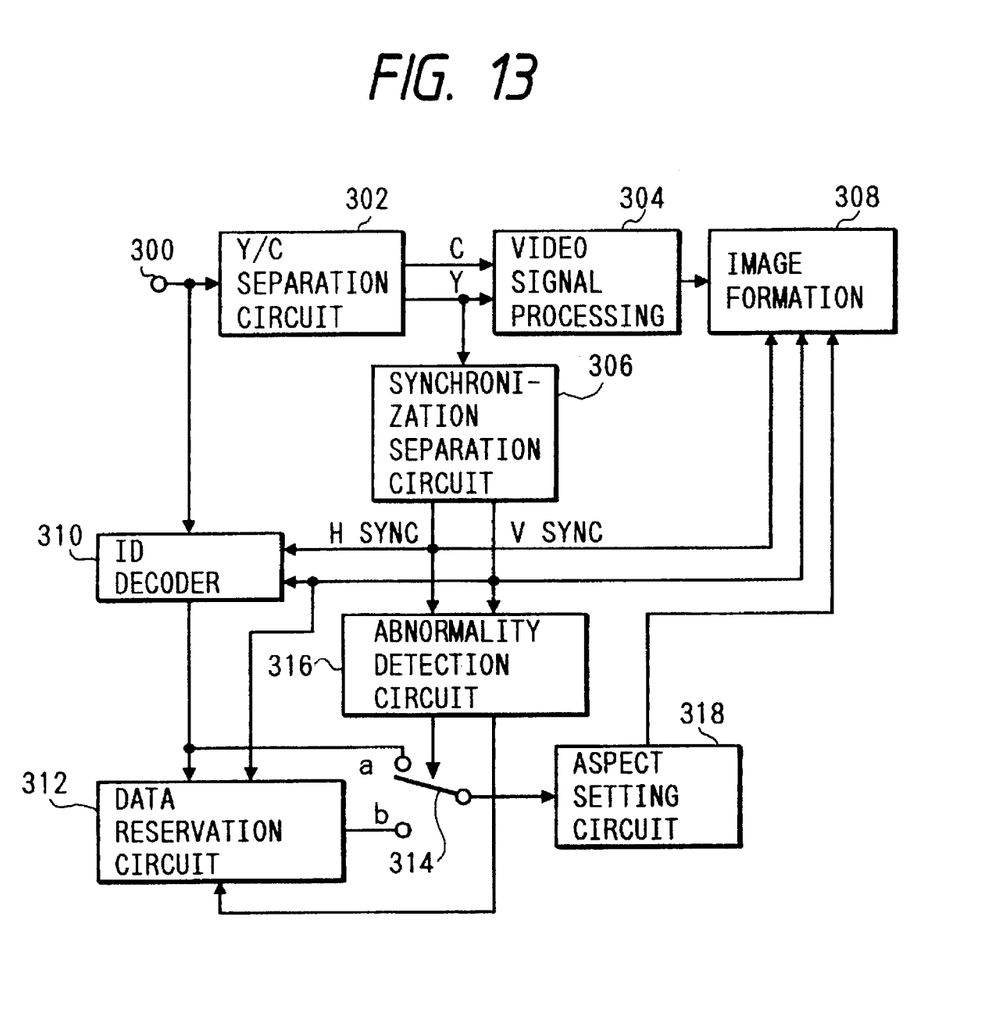
FIG. 13 is a block diagram showing the structure of a wide monitor according to the embodiment.

In FIG. 13, reference numeral 300 represents an input terminal to which a video signal of a display image is applied. A Y/C separation circuit 302 separates a video signal supplied via the input terminal 300 into a luminance signal and chrominance signals which are supplied to a video signal processing circuit 304 to generate R, G, and B signals for example to form an image.

A synchronization separation circuit 306 separates a composite synchronization signal contained in the luminance signal outputted from the Y/C separation circuit, to output a horizontal synchronization signal Hsync and a vertical synchronization signal Vsync. The outputs of the video signal processing circuit 304 and the horizontal and vertical synchronization signals Hsync and Vsync separated by the synchronization separation circuit 306 are supplied to an image formation circuit 308. The image formation circuit 308 displays a color image on a CRT display or liquid crystal display by using the signals supplied from the video signal processing circuit 304 under the control of the horizontal and vertical synchronization signals Hsync and Vsync. The signal processing by the circuits 302, 304, 306, and 308 is well known in the art.

An ID decoder 310 detects the aspect ID contained in the video signal supplied via the input terminal 300, by referring to the horizontal and vertical synchronization signals Hsync and Vsync separated by the synchronization separation circuit 306. Specifically, as described earlier, the aspect IDs are detected from the twentieth and two hundreds and eighty third lines as counted from the vertical synchronization signal Vsync during the vertical blanking period.

The aspect ID detected by the ID decoder 310 is supplied to a data reservation circuit 312 and to a contact a of a switch 314. The data reservation circuit 312 holds an output (aspect data) of the ID decoder 310 synchronously with the vertical synchronization signal Vsync supplied from the synchronization separation circuit 306 to update the held data. Namely, the data reservation circuit 312 holds the same output of the ID decoder 310 at least during one vertical synchronization period. The aspect data held by the data reservation circuit 312 is applied to the contact b of the switch 314.

The switch 314 is connected to the contact a in an ordinary case. However, the switch 314 is connected to the contact b by an abnormal state detection signal from an abnormality detection circuit 316. The abnormality detection circuit 316 has a circuit for judging, while referring to the horizontal and vertical synchronization signals Hsync and Vsync, whether there are cutting pulses during a predetermined period after the rise of the vertical synchronization signal Vsync. If there is no cutting pulse, an abnormal state detection signal is outputted relative to the next field. When the abnormality detection circuit 316 detects an abnormal state of the vertical synchronization signal, the switch 314 is connected to the contact b to select the aspect data of the preceding field held by the data reservation circuit 312.

The aspect data selected by the switch 314 is applied to an aspect setting circuit 318 which then controls the aspect ratio of an image to be Generated by the image formation circuit 308.

Figure 14:
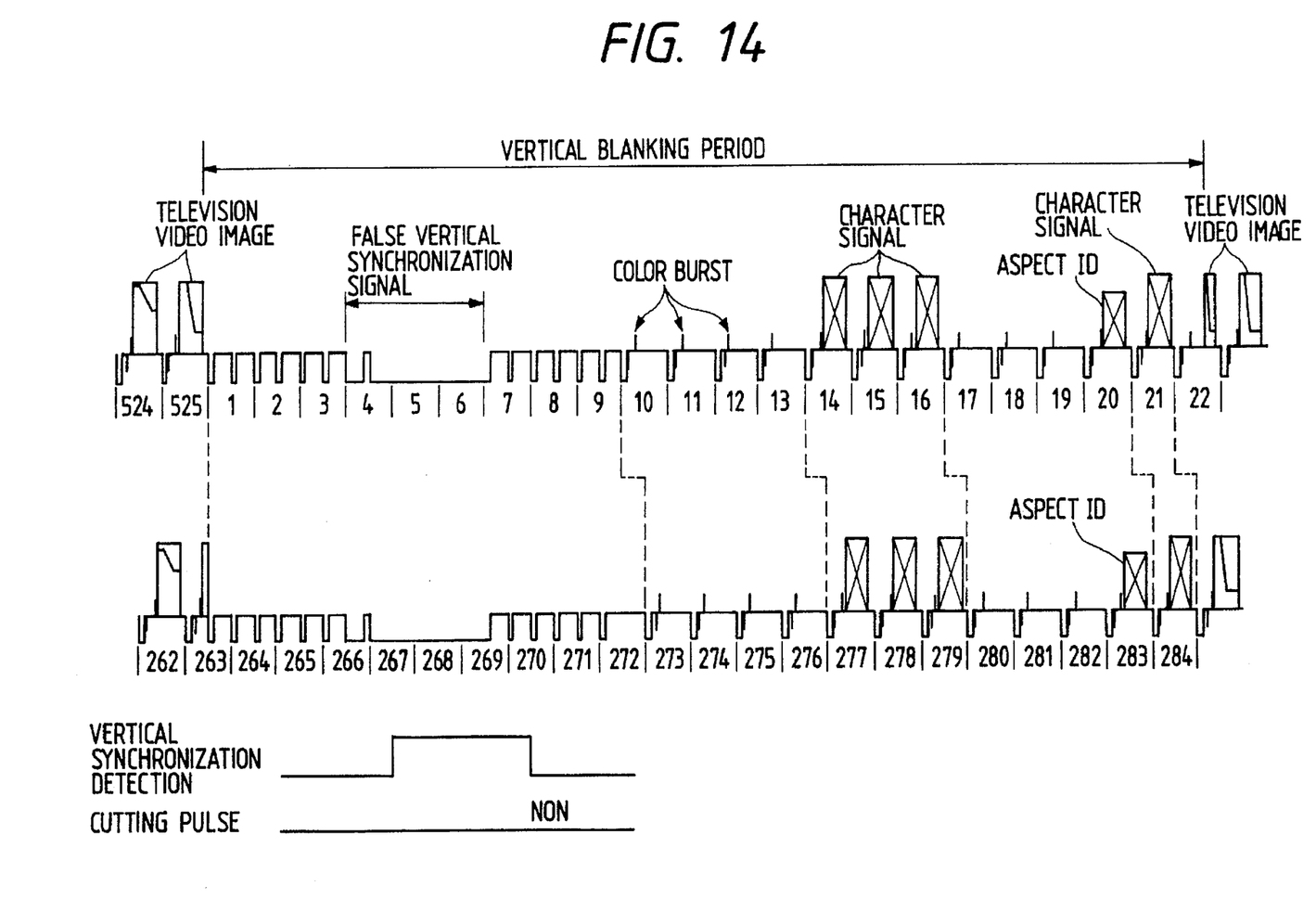
FIG. 14 is a timing chart showing video signal waveforms with false vertical synchronization signals and cutting pulses within a vertical synchronizing signal.

In FIG. 2, a normal video signal waveform having cutting pulses on the vertical synchronization signal as well as a cutting pulse detection signal is shown. FIG. 14 shows a video signal waveform having a false vertical synchronization signal during a VTR specific reproduction operation as well as a cutting pulse detection signal. As seen from FIG. 14, not only the position and length of the false vertical synchronization signal are unstable, but also no cutting pulse is present on the vertical synchronization signal. The abnormality detection circuit 316 judges that the video signal shown in FIG. 14 is abnormal, and outputs an abnormal state detection signal.

In this embodiment, the data reservation circuit 312 is cleared at each field. The held data may be continued to be held while the abnormality detection circuit 316 detects an abnormal state. This arrangement is effective for example when VTR moves to a specific reproduction mode from the ordinary reproduction mode. In this case, the vertical synchronization signal Vsync from the synchronization separation circuit 306 is masked by the abnormal state detection signal from the abnormality detection circuit 306.

In this embodiment, an abnormal state is judged from a presence/absence of cutting pulses on the vertical synchronization signal. An abnormal state may be judged from the number of horizontal synchronization signals Hsync between vertical synchronization signals Vsync. For example, if the number of horizontal synchronization signals is within plus minus two of a predetermined value, it is judged normal, and if it is outside of this range, it is judged abnormal. In a VTR specific reproduction operation, the false vertical synchronization signal is generated and added to the video signal. Accordingly, the number of horizontal synchronization signals between vertical synchronization signals reduces more than three as compared to the normal video signal, and the video signal is judged abnormal. For such an abnormal state detection algorithm, the holding period of the aspect data in the data reservation circuit 312 is set to at least two fields.

As readily understood from the foregoing description, according to this embodiment, for an input video signal unable to correctly detect aspect information as in the case of the VTR specific reproduction operation, the aspect ratio of an image to be displayed on the screen is controlled by the past aspect information held in the data reservation circuit. It is therefore possible to display image with a predetermined aspect ratio, irrespective of the quality of the input video signal.

The present invention may be reduced in practice in various forms without departing from the true spirit and scope of the invention.

For example, instead of the aspect ID representing the aspect ratio used in the embodiments, other signal formats representing the aspect ratio may also be used.

In other words, the foregoing description of embodiments has been given for illustrative purposes only and not to be construed as imposing any limitation in every respect.

The scope of the invention is, therefore, to be determined solely by the following claims and not limited by the text of the specifications, and alterations made within a scope equivalent to the scope of the claims fall within the true spirit and scope of the invention.

What is claimed is:

1. A video signal processing apparatus comprising:
   a) reproduction means for reproducing a video signal recorded on a recording medium, said reproducing means having a plurality of reproduction modes;
   b) detecting means for detecting an aspect ratio of said video signal reproduced by reproducing means;
   c) storage means for storing the aspect ratio data detected by said detecting means; and
   d) output means for selectively outputting the aspect ratio data outputted from said detecting means and the aspect ratio data stored by said storage means, in accordance with the reproduction mode of said reproducing means.

2. A video signal processing apparatus according to claim 1, further comprising adding means for adding the aspect ratio data outputted by said output means to an image signal reproduced by said reproducing means.

3. A video signal processing apparatus according to claim 2, wherein said adding means superposes the aspect ratio data on the video signal within the vertical blanking period.

4. A video signal processing apparatus according to claim 1, wherein said detecting means detects the aspect ratio data superposed on the video signal within the vertical blanking period.

5. A video signal processing apparatus comprising:
   a) input means for inputting a video signal, the video signal being added with aspect ratio data of the video signal;
   b) detecting means for detecting the aspect ratio data;
   c) holding means for holding the aspect ratio data detected by said detecting means; and
   d) adding means for newly adding the aspect ratio data held by said holding means to the video signal.

6. A video signal processing apparatus according to claim 5, wherein said input means includes reproducing means for reproducing a signal recorded on a recording medium.

7. A video signal processing apparatus according to claim 5, wherein said aspect ratio data is superposed on the video signal within the vertical blanking period.

8. A video signal processing apparatus according to claim 5, wherein said holding means holds said aspect ratio data at least during one vertical synchronization period.

9. A video signal processing apparatus comprising
   reproduction means for reproducing a video signal recorded on a recording medium,
   detection means for detecting aspect ratio of the video signal reproduced by said reproduction means and outputting aspect data representing the detected aspect ratio,
   storage means for storing the aspect data outputted from said detection means, and
   output means for selectively outputting the aspect data outputted from the detection means and the aspect data stored in said storage means, according to a reproduction mode of said reproduction means.

10. An apparatus according to claim 9, further comprising processing means for processing the video signal reproduced by said reproduction means, according to the aspect data outputted from said output means.

11. An apparatus according to claim 9, wherein said reproduction mode includes a normal reproduction mode and specific reproduction mode.

12. An apparatus according to claim 11, wherein said output means outputs the aspect data stored in said storage means during the specific reproduction mode.

13. An apparatus according to claim 12, wherein the characteristic information of the video signal is information as to an aspect ratio.

* * * * *